(12) United States Patent
Hiremath et al.

(10) Patent No.: US 12,057,700 B2
(45) Date of Patent: Aug. 6, 2024

(54) SYSTEMS AND METHODS FOR POWER FACTOR CORRECTION

(71) Applicant: Cummins Power Generation Limited, Ramsgate (GB)

(72) Inventors: Apoorv P. Hiremath, Ramsgate (GB); Ankit Vinodchandra Patel, Margate (GB); Philippe Goesel, Ramsgate (GB); Sudharsana Govindaswami, Ramsgate (GB)

(73) Assignee: Cummins Power Generation Limited, Ramsgate (GB)

( * ) Notice: Subject to any disclaimer, the term of this patent is extended or adjusted under 35 U.S.C. 154(b) by 164 days.

(21) Appl. No.: 17/766,159

(22) PCT Filed: Oct. 1, 2020

(86) PCT No.: PCT/IB2020/059228
§ 371 (c)(1),
(2) Date: Apr. 1, 2022

(87) PCT Pub. No.: WO2021/064645
PCT Pub. Date: Apr. 8, 2021

(65) Prior Publication Data
US 2022/0376506 A1 Nov. 24, 2022

Related U.S. Application Data

(60) Provisional application No. 62/910,106, filed on Oct. 3, 2019.

(51) Int. Cl.
*H02J 3/18* (2006.01)
*H02J 3/00* (2006.01)
(52) U.S. Cl.
CPC ............ *H02J 3/1892* (2013.01); *H02J 3/001* (2020.01)

(58) Field of Classification Search
CPC .. H02P 9/00; H02P 9/006; H02P 9/007; H02P 9/008; H02P 2101/00; H02P 21/22;
(Continued)

(56) References Cited

U.S. PATENT DOCUMENTS

2010/0002475 A1\* 1/2010 Folts .................. H02J 9/062
363/37
2015/0137520 A1 5/2015 Garcia

FOREIGN PATENT DOCUMENTS

DE 10 2016 122 581 A1 5/2018
DE 10 2018 102 220 A1 8/2019

OTHER PUBLICATIONS

International Search Report and Written Opinion for International Application No. PCT/IB2020/059228 mailing date Dec. 1, 2020, 14 pages.

\* cited by examiner

*Primary Examiner* — Antony M Paul
(74) *Attorney, Agent, or Firm* — Foley & Lardner LLP

(57) ABSTRACT

Systems and methods for controlling and methods for controlling the power factor in a generator system are provided. In some embodiments, the generator system includes one or more generators configured to supply power to a power grid, an automatic voltage regulator configured to regulate a voltage of an output of the generator to a set voltage and regulate a power factor of the output to a set power factor, and a controller. The controller is configured to detect a fault on the output and to adjust the set power factor of the automatic voltage regulator based on the fault. The controller is further configured to ramp the set power factor from the adjusted value to an initial value over a set period of time.

20 Claims, 5 Drawing Sheets

(58) Field of Classification Search
CPC .......... H02P 2101/15; H02P 9/04; H02P 9/08; H02P 9/10; H02P 9/105; H02P 9/107; H02P 9/46; H02P 9/305; H02P 11/06; H02P 23/26; H02P 25/062; H02P 25/00; H02P 27/00; H02P 27/04; H02P 27/06; H02P 27/08; H02P 29/00; H02P 29/02; H02P 29/024; H02P 29/028; H02P 29/032; H02P 1/26; H02P 1/42; H02P 7/343; H02P 7/347; H02J 3/381; H02J 3/18; H02J 3/36; H02J 3/1842; H02J 3/12; H02J 9/062; H02J 3/46; H02J 3/38; H02J 3/16; H02J 13/00002; H02J 2300/28; H02J 5/00; H02M 3/33507; F03D 7/00; F03D 7/0284; F03D 9/255
See application file for complete search history.

SYSTEMS AND METHODS FOR POWER FACTOR CORRECTION

CROSS-REFERENCE TO RELATED APPLICATION

The present application is a U.S. National Stage of P.C.T Application No. PCT/IB2020/059228 filed Oct. 1, 2020, which claims priority to U.S. Provisional Application No. 62/910,106 filed Oct. 3, 2019, which is incorporated herein by reference in its entirety.

TECHNICAL FIELD

The present disclosure relates generally to the field of generators. More particularly, the present disclosure relates to systems and methods for controlling a power factor of an output of a generator.

BACKGROUND

Generators can be connected to a power grid to supply power to various loads. The power output of a generator includes actual power and reactive power. The ratio between actual power and reactive power define a power factor. The power grid requires stable voltage in order to prevent damage to the various loads. In a situation where a voltage on the power grid drops below a set voltage, the generator must supply reactive power in order to support the voltage on the power grid. However, upon recovery of the voltage on the power grid, the generator may consume reactive power from the grid, which may cause further undesired fluctuations in voltage.

SUMMARY

One embodiment of the disclosure relates to a generator system. The generator system includes a generator configured to supply power to a power grid, an automatic voltage regulator configured to regulate a voltage of an output of the generator to a set voltage and regulate a power factor of the output to a set power factor, and a controller configured to detect a fault on the output of the generator, adjust the set power factor from an initial value to an adjusted value based on the fault, and ramp the set power factor from the adjusted value back to the initial value over a set time period. In some embodiments, the fault is an under voltage ride through (UVRT) condition. In some embodiments, determining the fault of the system includes detecting an amount that the voltage of the output of the generator is below the set voltage. In some embodiments, adjusting the set power factor based on the fault comprises interpolating an amount to adjust the set power factor based on the amount that the voltage of the output is below the set voltage and adjusting the set power factor from the initial value by the amount to the adjusted value. In some embodiments, the interpolation between the amount to adjust the set power factor and the amount that the voltage of the output is below the set voltage is linear. In some embodiments, ramping between the adjusted set power factor and the initial value of the set power factor comprises a step-wise linear function over the set time period.

Another embodiment relates to a controller of one or more generators. The controller including a processor that is configured to detect a fault on an output of the one or more generators, adjust a set power factor of an automatic voltage regulator connected to the one or more generators based on the fault, and ramp the set power factor back to an initial value over a set period of time, where the set period of time is based on the fault. In some embodiments, the controller also includes an output terminal configured to connect to the automatic voltage regulator, the automatic voltage regulator configured to regulate the voltage of the output of the one or more generators to the set voltage and regulate a power factor of the output of the one or more generators to the set power factor, wherein the processor is further configured to output a direct current (DC) bias signal via the output terminal, and wherein the DC bias signal is configured to control the set power factor. In some embodiments, adjusting and ramping the set power factor includes tuning the DC bias signal within a range of 0 and 10 volts.

Another embodiment relates to a method of controlling a power factor of a generator system. The method includes detecting, by a controller of a generator system, a fault on a power grid, determining, by the controller, an adjusted value for a set power factor based on the fault, adjusting, by the generator system, the set power factor from an initial value to the adjusted value, and ramping, by the generator system, the set power factor from the adjusted value back to the over a set period of time. In some embodiments, ramping the adjusted power factor back to the initial value is done in a step-wise linear fashion over the set time period, and wherein the set time period is determined based on the amount of power factor correction.

BRIEF DESCRIPTION OF THE DRAWINGS

The disclosure will become more fully understood from the following detailed description, taken in conjunction with the accompanying figures, wherein like reference numerals refer to like elements, in which.

DETAILED DESCRIPTION

Figure 1:
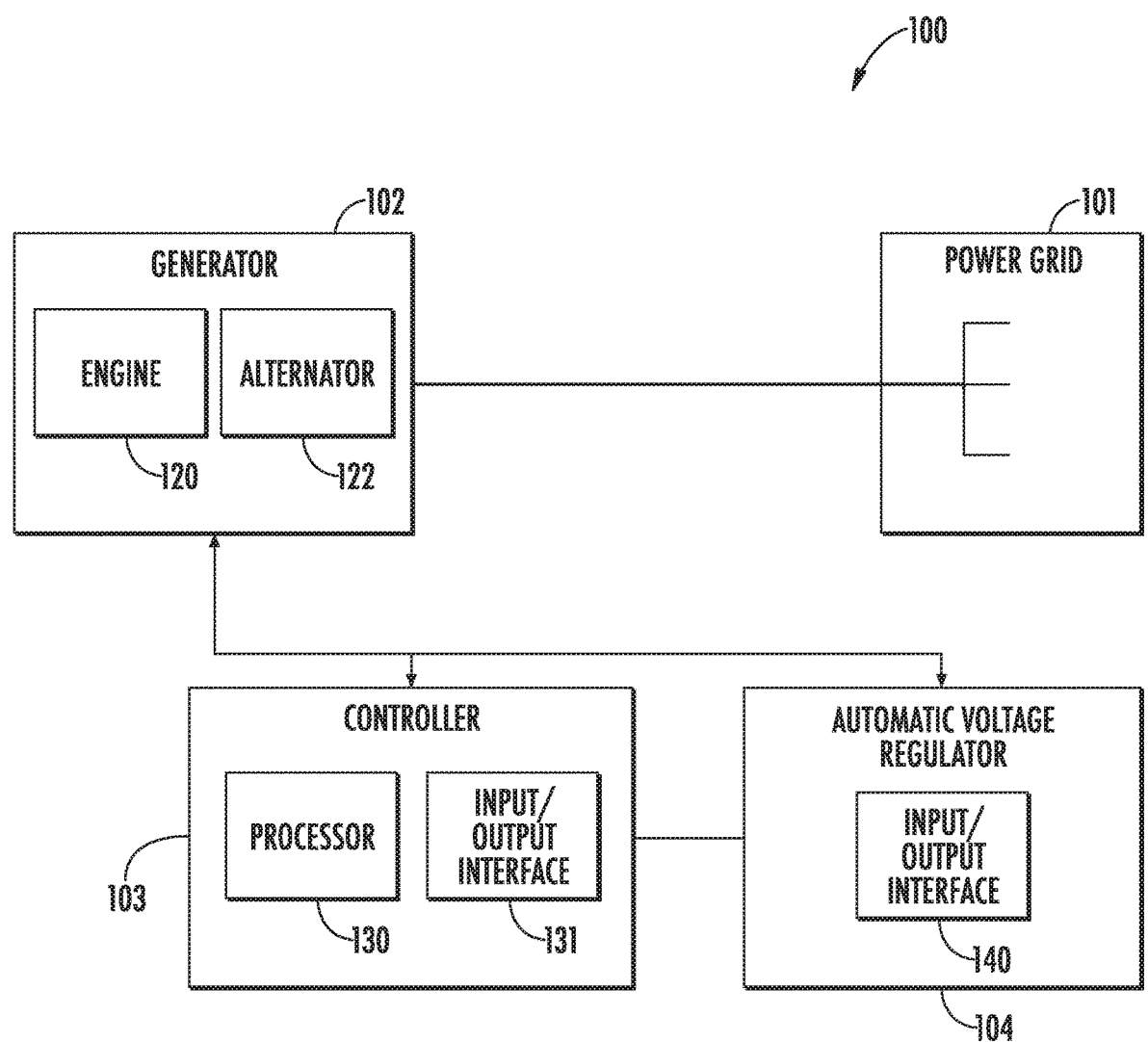
FIG. 1 is a block diagram illustrating a generator system according to an exemplary embodiment.

Before turning to the figures, which illustrate the exemplary embodiments in detail, it should be understood that the application is not limited to the details or methodology set forth in the description or illustrated in the figures. It should also be understood that the terminology is for the purpose of description only and should not be regarded as limiting.

Referring generally to the figures, systems and methods that may be used to power loads in conjunction with generators are provided according to exemplary embodiments. One or more generators (e.g., generator sets, or gensets) are used to provide power to one or more loads on a power grid. The power grid may have one or more generator sets connected in parallel that support the power grid and thereby the loads of the power grid. The generator sets have controllers that maintain a power factor for each generator set. The power factor is the ratio of real power to reactive power output by the generator sets. In a stable operating condition, the controllers maximize the power factor in order to ensure that the generator sets are operating at maximum efficiency (e.g., that the generator sets are producing as much real power as possible and not wasting fuel or other resources by generating excess reactive power.)

However, the power demands of the loads in the power grid may vary with changing conditions, such as increasing and decreasing draw on the power grid. For example, a large draw on the grid (e.g., a factory starting large industrial equipment, generally a large inductive load) may cause the voltage on the power grid to drop suddenly. In this example, the power grid requires support from the generator sets connected to the power grid in order to recover/support the voltage quickly and thereby avoid any damage to electronics and other electrical equipment also connected to the power grid. Volt-ampere reactive (VAR) is a unit of measurement of reactive power. Reactive power exists in an AC circuit when the current and voltage are not in phase and defines the power factor of the system. The power factor of an AC electrical power system is the ratio of the real power absorbed by the load to the apparent power flowing in the circuit. The generator sets support the power grid and keep the voltage steady by outputting reactive power. However, once the voltage has recovered, the generator sets may consume reactive power from power grid due to the generator sets controllers attempting to recover the generator set to the pre-fault power factor, which causes further variances in the voltage on the power grid. This is undesirable and in fact not in compliance with grid code compliance (GCC) in certain areas (e.g., Europe).

To address the issue of generator systems consuming reactive power from the power grid after a fault (e.g., a voltage dip requiring the generator set to output reactive power), the present disclosure provided exemplary systems and methods for controlling the power factor in generator systems that need to comply with GCC using a non-compliant controller. An exemplary generator system includes one or more generators coupled to a power grid, a voltage regulator (e.g., an automatic voltage regulator AVR) connected to the one or more generators, and a controller connected to the voltage regulator and the one or more generators. The AVR is configured to regulate a voltage of an output of the generator to a set voltage and regulate a power factor of the output to a set power factor. The controller is configured to detect a fault (e.g., drop in voltage from the set voltage) and to adjust the set power factor an amount from an initial value to an adjusted value based on the fault. The controller is also configured to ramp the set power factor from the adjusted value back to the initial value over a set period of time. The set period of time is based on the amount adjusted to the power factor (e.g., and thereby also based on the fault.) The ramping ensures that the generator system does not enter into a state where the one or more generators are consuming reactive power from the power grid by mitigating integral wind-up caused by the offset of the power factor.

Referring to FIG. 1, a block diagram illustrating a generator system 100 according to an exemplary embodiment is shown. In the illustrated embodiment, the generator system 100 includes a generator 102, a controller 103, and an automatic voltage regulator (AVR) 104. In some embodiments, the generators system 100 may include one or more generators 102. The generator 102 may include an engine 120 coupled to an alternator 122. In some embodiments, the generator 102 may include one or more engines 120 and alternators 122. The engine 120 may be any type of machine configured to convert energy, such as fuel, into mechanical energy (e.g., motion). The engine 120 may be an internal combustion engine, such as a diesel engine.

The alternator 122 may be any type of machine configured to convert mechanical energy into electrical energy, such as an alternating current. In some embodiments, the alternator 122 includes a field winding, a rotor, and multiple poles. The field winding may be excited with a direct current (DC) in order to create a magnetic field and adjust the power factor. The rotor may be driven by the engine 120 and thereby create electric power. In some embodiments, generator 102 may include different and/or additional components than engine 120 and alternator 122 (e.g., a hydraulically powered generator driven using hydraulic fluid). The generator system 100 may be a mastered or masterless system (e.g., a masterless load demand genset system or a mastered paralleled genset system, with a centralized system controller coordinating the generators 102 of the system 100, or a distributed system 100 control contained in the generators 102 of the system 100, respectively).

An output of the generator 102 is connected to a power grid 101. The power grid 101 may be a local power grid (e.g., a power grid for a building, or multiple rooms) or a larger power grid 101 that supports one or more cities, towns, or villages. In some embodiments, the power grid 101 includes three phases. In this example, the generator 102 may include three outputs where each output is connected to one of the three phases. In alternative embodiments, the power grid 101 may include one or more phases, and the generator 102 may include any number of outputs connected to the one or more phases.

The automatic voltage regulator (AVR) 104 may include an input/output interface 140. The AVR 104 may also include various hardware components to implement the AVR 104 either with static electronics or dynamic moving parts. In some embodiments, the input/output interface 140 includes an electrical bus. The input/output interface 140 may include a first input terminal that is connected to the output of the generator 102 and that is configured to monitor the output characteristics of the generator 102. In one example, the AVR 104 may monitor the voltage of output of the generator 102 in order to ensure that the voltage at the output is near or at a set voltage. The set voltage is the pre-determined voltage that the generator 102 must maintain in order to support the power grid 101. The voltage at the output of the generator 102 (and thereby on the power grid 101) will be affected by the loads on the power grid 101. For example, if a large industrial load is added to the power grid 101, the voltage of the power grid 101 (and thereby the voltage of the output of the generator 102) will dip until the power grid 101 receives enough power to drive the large industrial load (large inductive loads, such as large electric machinery or motors, can alter the power factor of the grid 101). The AVR 104 may control the engine or alternator in order to regulate the voltage on the output of the generator 102 to the set voltage.

Additionally or alternatively, the first input may also monitor the phase of the voltage and current on the output of the generator 102 in order to detect a power factor (via the leading or lagging current and voltage phases) of the output of the generator. In other embodiments, one or more first input terminals may be used by the AVR 104 in order to monitor the voltage and power factor of the output of the generator 102. In some embodiments, the AVR 104 may include sensors to monitor the voltage or power factor on the output of the generator. In some embodiments, the AVR 104 may receive via the one or more input terminals outputs from sensors that sense the voltage and current of the output of the generator 102. In some embodiments, the AVR 104 has a first priority to regulate the voltage on the output to the set voltage and a second priority to regulate the power factor of the generator 102 to the set power factor. In some embodiments, the AVR 104 may monitor the line voltage between one or more outputs on the generator 102. The one or more outputs on the generator 102 may each be connected to phase of the power grid 101. In some embodiments the AVR 104 may monitor the phase voltage (e.g., the phase to neutral voltage) between the one or more outputs of the generator 102 that are each connected to a phase of the power grid 101. In some embodiments, the set voltage may be dependent on which voltage (e.g., line or phase) is being monitored.

The input/output interface 140 may include a second input terminal that is connected to the controller 103 that is configured to receive a signal that indicates a set power factor for the generator system 100. In some embodiments, the signal that indicates the set power factor is a direct current (DC) bias signal that is within a range of 0 volts to 10 volts. In this example, a DC bias signal of 10 volts may indicate to the AVR 104 that the set power factor should be at a maximum (e.g., determined based on the particular generator 102). In one example, the maximum set power factor is 0.9 or larger. In another example, a DC bias signal of 0 volts may indicate to the AVR 104 that the set power factor should be at a minimum. In this example, AVR 104 the power factor may be around 0.6. The DC bias signal may have a linear relationship between the 0-10 volts and the set power factor. It is to be appreciated that these examples are only some potential implementations, in other embodiments, other signals may be input via the second input terminal that indicate to the AVR 104 the set power factor. In other embodiments, the AVR 104 may be integrated with the controller 103. In yet other embodiments, one or more second input terminals may be used by the AVR 104 in order to receive information regarding the set power factor and the set voltage from the controller 103.

The input/output interface 140 may include a first output terminal that may be connected to the generator 102 in order to control the power factor of the output of the generator 102. For example, in some embodiments, the first output terminal may be connected to a field winding of the alternator 122 in order to induce or control a direct current into the field winding in order to control the power factor of the output of the generator 102. In other embodiments, the AVR 104 may control the actual power factor of the output of the generator 102 via other facilitations or designs. In some embodiments, one or more first output terminals may be used by the AVR 104 in order to control the power factor and the voltage of the output of the generator 102. For example, the AVR 104 may utilize one or more first output terminals that are configured to signal to the generator 102 to spin faster, increase torque, or burn more fuel in order to regulate the voltage of the output of the generator 102 to the set voltage 104. In other embodiments, other methods of techniques may be used to regulate the voltage of the output of the generator 102 to the set voltage and regulate the power factor of the output of the generator to the set power factor.

The input/output interface 140 may include a second output terminal may be connected to the controller 103 and configured to provide the controller 103 with feedback regarding the output of the generator 102 (e.g., voltage, leading or lagging current, power factor, etc.) or the state of the AVR 104 (e.g., set power factor.) In some embodiments, one or more second output terminals may be connected to the controller in order to provide the controller 103 with feedback. In some embodiments, the input/output interface 140 may be wired via a physical electrical connection to the other components. In some embodiments, the input/output interface 140 may be wired via a physical electrical connection to some components (e.g., to the generator 102) and wirelessly connected to some components (e.g., to the controller, or the sensors monitoring the output of the generator 102). In some embodiments, the input/output interface 140 is connected to all of the other components wirelessly. That is, it is to be appreciated that terms such as "terminal" are not meant to be limited to a physical terminal configured to be connected physically to another device or "terminal" unless expressly recited.

The controller 103 may include a processor 130 and an input/output terminal 131. The processor 130 may include one or more processors 130 or one or more processors that include multiple processing cores. The controller 103 may also include a memory device that is configured to store machine-readable media. The machine readable media being readable by the processor 130 in order to execute the programs stored therein. The memory device may also include a database of set values, interpolation graphs (e.g., data), or other control or calculation parameters.

The input/output interface 131 may include one or more terminals configured to connect to the AVR 104 or the generator 102. For example, as discussed above, a first output terminal of the input/output interface 131 may be connected to the second input terminal of the AVR 104 in order to signal to the AVR 104 the set power factor or the set voltage. Additionally, as discussed above, the input/output interface 131 may include a first input terminal configured to connect to the second output terminal of the AVR 104 in order to receive feedback or other information from the AVR. The first input terminal and the first output terminal of the input/output interface 131 may be embodied as one or more physical contacts or as a combination of physical electrical contacts and wireless terminals.

In some embodiments, the input/output interface 131 may also include a second input terminal that may be connected to one or more sensors (not depicted) that measure the voltage and power factor of the output of the generator 102. In some embodiments, the controller 103 receives the information regarding the voltage and power factor of the output of the generator 102 directly from the sensors monitoring the output. In some embodiments, the controller 103 receives the information regarding the voltage and power factor of the output of the generator 102 from the AVR 104. In some embodiments, the controller 103 may receive information regarding the voltage and power factor of the output of the generator 102 from multiples sources (e.g., the AVR 104 and the sensors). The second input terminal may be embodied as one or more physical contacts or a combination of physical electrical contacts on a bus and wireless terminals. In some embodiments, the AVR 104 and the controller 103 may be integrated into one device and the communication therebetween may be more direct. Additionally or alternatively, the controller 103 may be connected to the generator 102 in a similar manner as the AVR 104 such that the controller 103 may perform the functions as described in reference to the AVR 104.

The controller 103 is configured to detect (i.e., determine) when a fault is present within the generator system 100. In response to detecting the fault, the controller 103 is configured to adjust the set power factor (e.g., via the DC bias signal) from an initial value to an adjusted value based on the fault and ramp the set power factor back to the initial value from the adjusted value over a set period of time.

Figure 2:
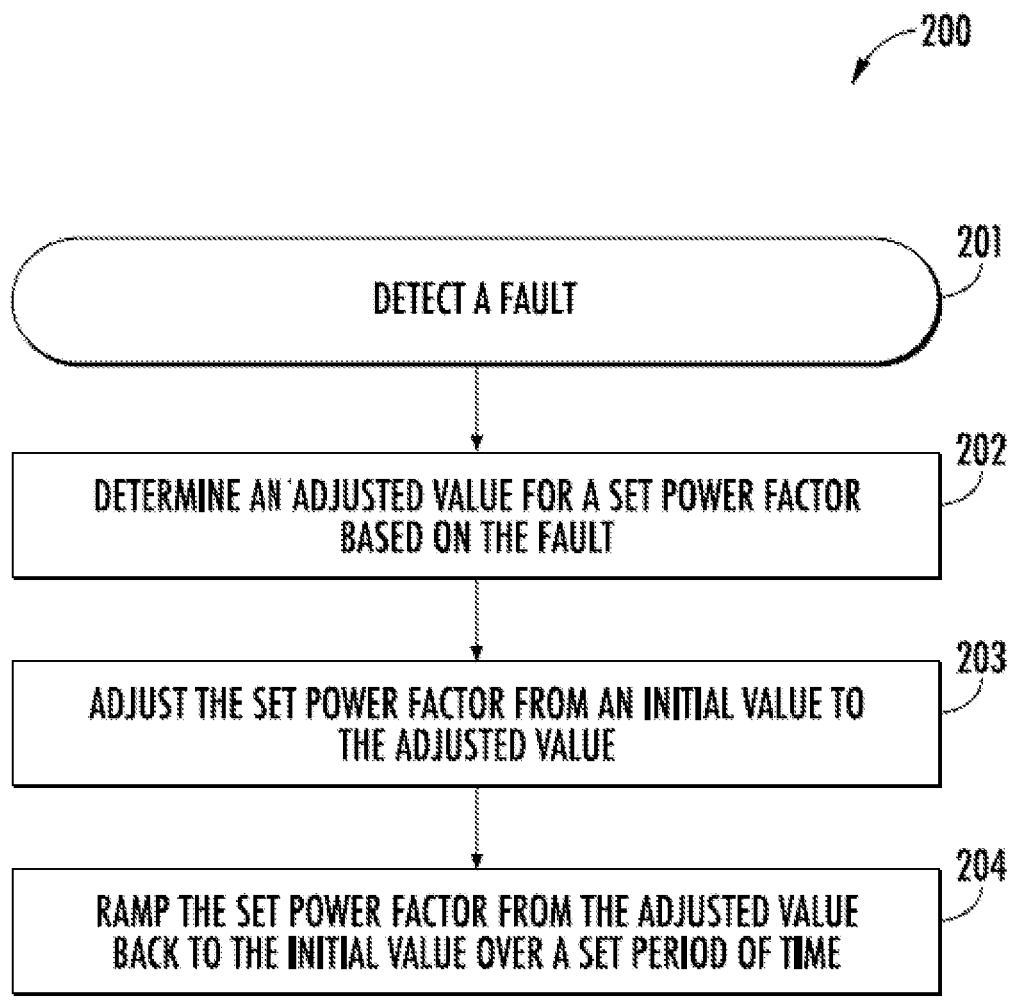
FIG. 2 is a flow diagram of a process for controlling a power factor of a generator system according to an exemplary embodiment.

FIG. 2 is a flow diagram of a process 200 for controlling a power factor of a generator system according to an exemplary embodiment. Reference may be made to various parts of FIG. 1 for purposes of demonstration while discussing FIG. 2. In process 201, a fault is detected on an output of the generator 102. In some embodiments, the AVR 104 or the controller 103 may detect the fault. In some embodiments, the fault is that the voltage on the output of the generator 102 is below an amount (e.g., 95%) of the set voltage. In some embodiments, the fault is that the voltage on the output of the generator 102 is below 90% the set voltage. In other embodiments, the percentage of the set voltage that triggers the fault may be set within a range of 85%-98%. The generator system 100 needs to react to the fault in order to stay connected to the power grid 101 an in compliance with GCC. The capability of reacting to the fault and staying connected to the power grid 101 by the generator system may be known as a fault ride through (FRT), an under voltage ride through (UVRT), or a low voltage ride through (LVRT).

In process 202, the controller 103 determines an adjusted value for the set power factor based on the fault. In some embodiments, adjusted value is proportional to the percentage that the voltage on the output of the generator 102 is below the set voltage. In some embodiments, adjusted value determined based on a linear interpolation between set power factor values and the percentage that the voltage on the output of the generator is below the set voltage. One example of determining the adjusted power factor is discussed below in reference to FIG. 3.

In process 203, the generator system 100 adjusts the set power factor from an initial value to the adjusted value. In some embodiments, the controller 103 may generate an output signal to the AVR 104 that is indicative of the adjusted value of the set power factor. For example, the controller 103 and the AVR 104 may have a DC bias signal connected therebetween. In some embodiments, the DC bias signal may be a signal within the range of 0-10 volts. Accordingly, the DC bias signal may be adjusted a proportional amount to the adjusted value from the initial value of the set power factor. In other implementations, the controller 103 may control or signal to the AVR 104 the adjusted value of the set power factor by any communication method. In some embodiments, the controller 103 and the AVR 104 are integrated together such that the controller 103 does not have to signal to the AVR 104 to change the set power factor, rather the AVR 104 may automatically receive, retrieve, or access the adjusted value of the set power factor.

In process 204, the generator system 100 ramps the set power factor from the adjusted value back to the initial value over a set period of time. Ramping is defined by any gradual relationship between the adjusted value and the initial value over the set period of time. In some embodiments, the ramping of the set power factor is done by the controller 103. In some embodiments, the controller 103 determines the set period of time based on the amount of the power factor correction. In some embodiments, the controller 102 ramps the set power factor back to the initial value linearly. In some embodiments, the controller 102 ramps the set power factor back to the initial value in a step-wise linear function. The step size of the step-wise linear function may be determined based on a proportion between the amount of power factor correction and the step size. In one example, step size is determined based on a linear interpolation between the step size and the amount of power factor correction. The set period of time may be determined by dividing difference between the initial value and the adjusted value by the step size and multiplying that output by a pre-determined step time of the step-wise linear function. In some embodiments, the pre-determined step time may be stored within the memory or otherwise hard coded into the controller 103. In alternative embodiments, the step time may be dynamically determined along with the step size in order to ramp the set power factor back from the adjusted value to the initial value. One example of determining the step size is discussed in reference to FIG. 4 below. In some embodiments, the memory on the controller may include a look-up table such that the controller 103 can reference the look up table in order to determine the step size.

In some embodiments, the controller 103 may ramp the set power factor by signaling each step size to the AVR 104. For example, the controller 103 and the AVR 104 may have a DC bias signal connected therebetween. In some embodiments, the DC bias signal be a signal within the range of 0-10 volts. Accordingly, the DC bias signal may be adjusted a proportional amount to of the step size after each step time such that the AVR 104 receives the new value of the set power factor for each respective step time. In other implementations, the controller 103 may control or signal to the AVR 104 the gradual changing values of the set power factor by any communication method. In some embodiments, the controller 103 may continuously and linearly adjust the DC bias from an adjusted value (e.g., 3 volts) that is proportional to the adjusted value of the set power factor to an initial value (e.g., 10 volts) that is indicative of the initial value of the set power factor. In some embodiments, the controller 103 may adjust the DC bias in a step-wise manner from an adjusted value (e.g., 3 volts) that is proportional to the adjusted value of the set power factor to an initial value (e.g., 10 volts) that is indicative of the initial value of the set power factor. In some embodiments, the controller 103 and the AVR 104 are integrated together such that the controller 103 does not have to signal to the AVR 104 to change the set power factor, rather the AVR 104 may automatically receive, retrieve, or access the changing values of the set power factor over the set time period.

Figure 3:
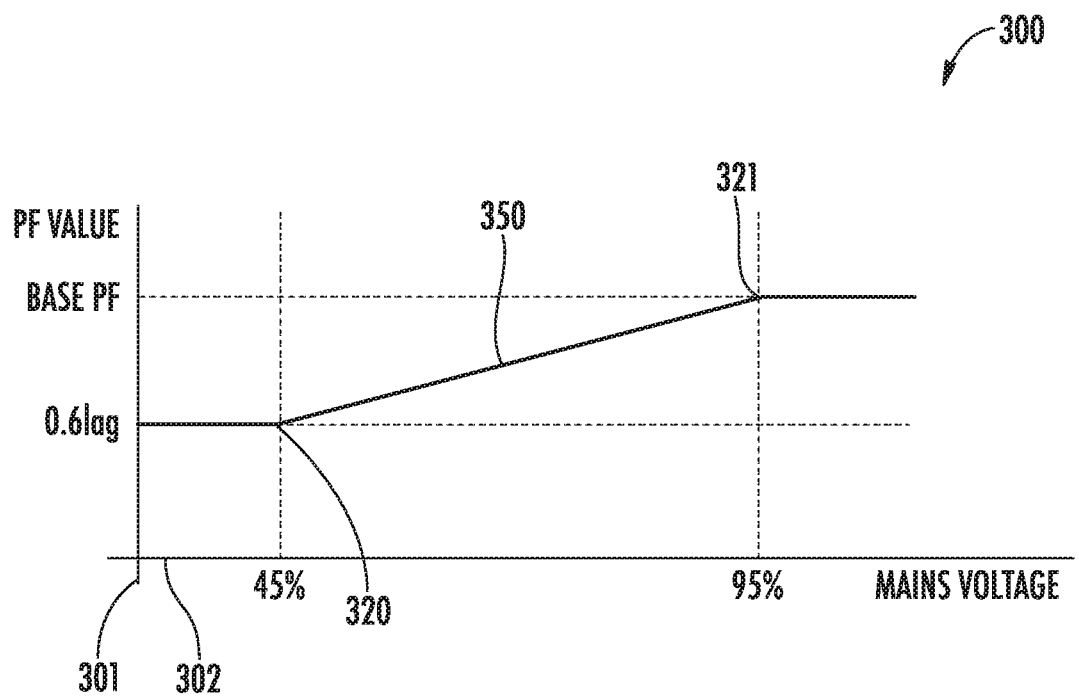
FIG. 3 is a power factor interpolation graph according to an exemplary embodiment.

FIG. 3 is a set power factor interpolation graph 300 according to an exemplary embodiment. That is, FIG. 3 depicts one example of process 202. The power factor interpolation graph includes a y-axis that is indicative of values for the set power factor and an x-axis that is indicative of values for the percentage that the voltage of the output of the generator has deviated from the set voltage. The graph has a first point 320 where the percentage that voltage of the output of the generator has deviated from the set voltage down to 45% of the rated grid voltage and the corresponding power factor value is 0.6 with a lagging current (outputting reactive power). The graph has a second point 321 where the percentage that voltage of the output of the generator is at 95% of the set voltage and the corresponding power factor value is the initial value for the set power factor. In some embodiments, the initial value may be 1.0. In some embodiments, the initial value may be dependent upon the generator. In some embodiments, the initial value may within the range of 0.85-1.0. The first point 320 and the second point 321 may be connected by line 350 such that any percentage deviation between the range of 45% and 95% can be interpolated to find an interpolated value of the power factor. The interpolated value may then be set as the adjusted value.

Figure 4:
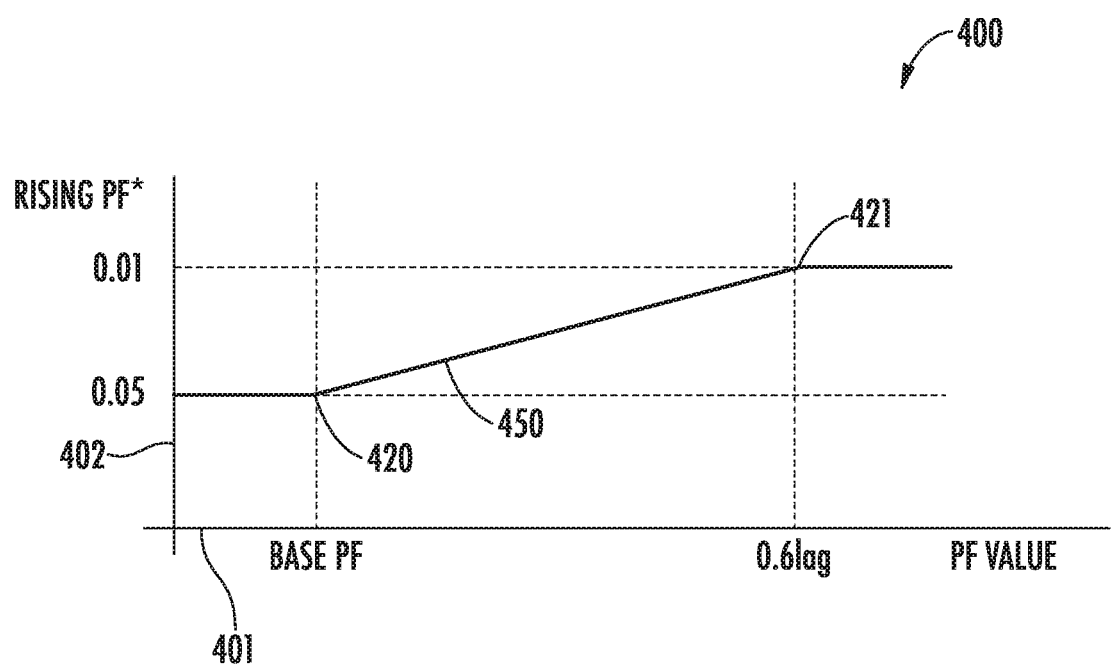
FIG. 4 is step size interpolation graph according to an exemplary embodiment.

FIG. 4 is step size interpolation graph 400 according to an exemplary embodiment. The interpolation graph 400 includes a y-axis that is indicative of values of a step size and an x-axis that is indicative of values of the adjusted value determined in FIG. 3. The step size interpolation graph 400 includes a first point 420 where the adjusted value is at maximum (e.g., the initial value of the set power factor) and the step size is at a minimum value of 0.05 power factor units per step time. The interpolation graph includes a second point 421 where the interpolation value is at a minimum (e.g., the adjusted value is 0.6 with the current lagging maximum) the step size is at a maximum value of 0.1 power factor units per step time. In some embodiments, the step time may be 100 milliseconds. In some embodiments, the step time may be 1 second. In some embodiments, the step size and the interpolation graph 400 will change depending upon the pre-determined step time. In other embodiments, other methods of interpolation may be used. In some embodiments, the memory may store a look-up table such that the controller 103 may reference the lookup table in order determine how to ramp (e.g., step size, step time, linear slope, set period of time, etc.) the set power factor value from the adjusted value back to the initial value.

Figure 5:
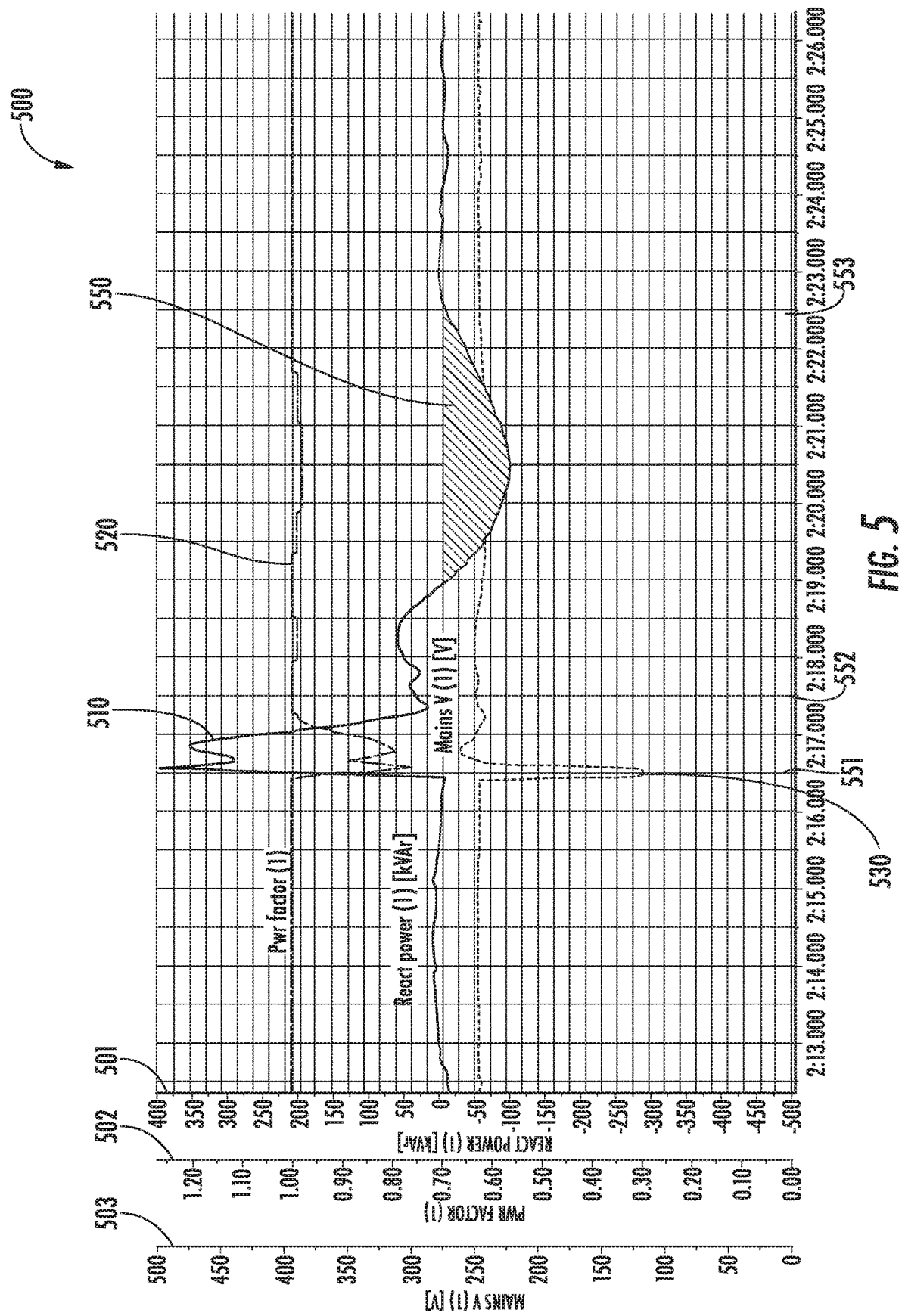
FIG. 5 depicts simulation results of a generator system not having power factor control according to an exemplary embodiment.

FIG. 5 depicts simulation results 500 of a generator system not having power factor control an exemplary embodiment. The simulation results 500 include an x-axis indicating time. The simulation results 500 include a y-axis that indicates the reactive power input/output 501 of the generator 102 to the power grid 101, a y-axis that indicates an actual power factor 502 of the output of the generator 102 connected to power grid 101, and a y-axis that indicates a voltage 503 on the output of the generator 102 and the power grid 101. The simulation results further include a reactive power graph 510 corresponding to the y-axis 501, an actual power factor graph 520 corresponding to the y-axis 502, and a voltage graph 530 that corresponds to the y-axis 503.

At time 551, the power grid experiences a voltage dip and the AVR 104 turns to a first priority of regulating the voltage to the set voltage. Thus, the AVR 104 and generator 102 supplies reactive power into the power grid in attempt to support/recover the voltage on the power grid (and thereby the output of the generator 102). As a result of the generator 102 supplying the reactive power (e.g., denoted by the spike in 510 at time 551), the actual power factor of the generator 102 drops (e.g., denoted by the dip in 510 at time 551). At time 552, the voltage on the power grid 101 has recovered and the generator 102 is supplying less reactive power to the power grid. As such, the actual power factor rises close to an initial value. Between time 552 and time 553 the power grid 101 enters into a transient state (e.g., the voltage 530 and the actual power factor 520 are settling). As a result, the generator 102 begins to consume reactive power from the power grid 101. This is depicted as a shaded area 550 that shows the amount time and the magnitude of the reactive power graph 510 below 0. Thus, as a result of consuming the reactive power, the generator system 100 is not grid code compliant and in fact may cause more transience in voltage on the power grid 101.

Figure 6:
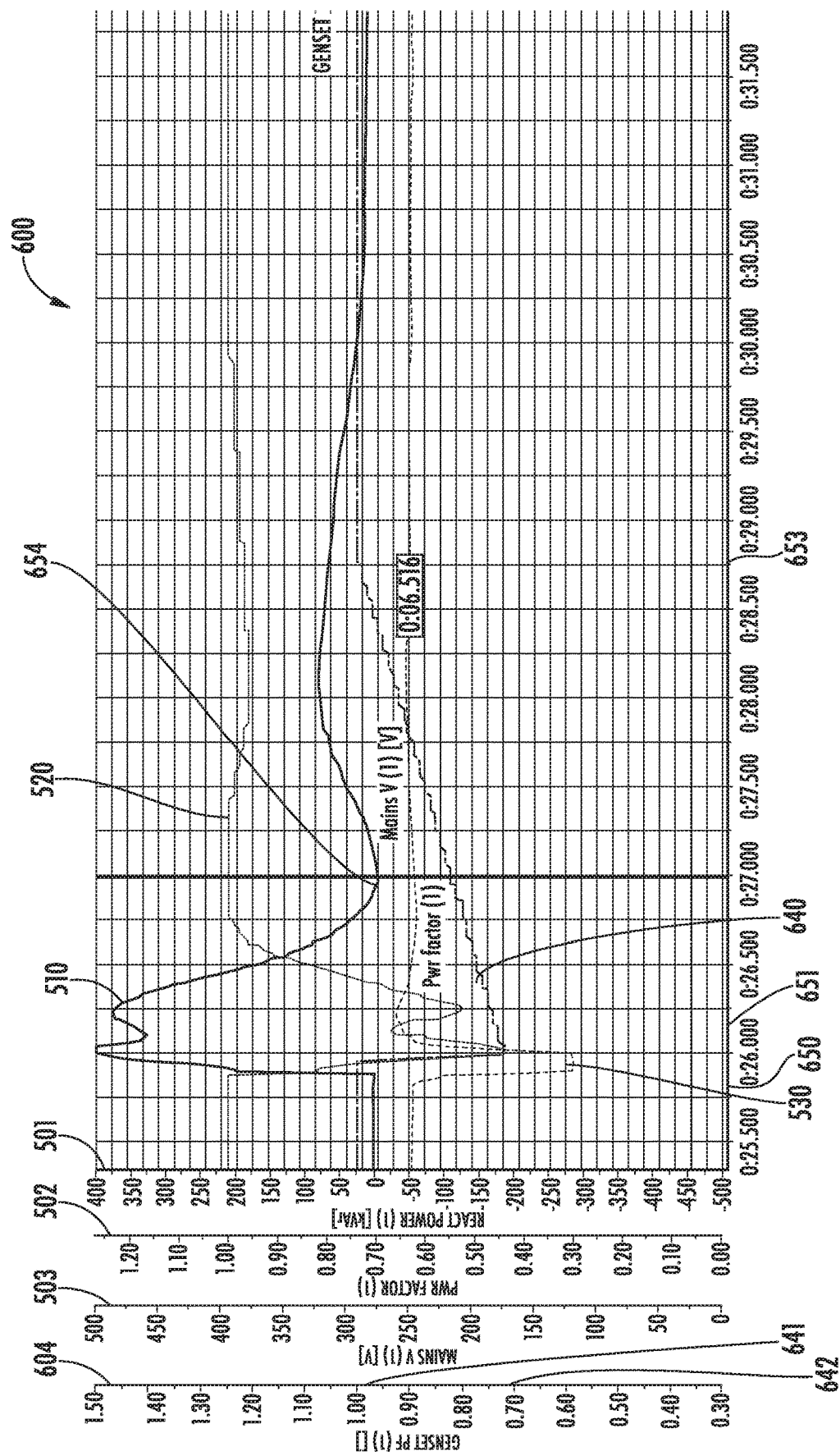
FIG. 6 depicts simulation results of a generator system having power factor control according to an exemplary embodiment.

During operation of the generator system 100, the bias signal from the AVR 104 is used to regulate genset reactive power (KVAR) to the desired power factor. However, during a voltage transient such as UVRT, the AVR 104 automatically switches to voltage regulation mode to regulate for change in output from the setpoint reference and effectively leads to reactive power consumption by the generator 102 as shown in FIG. 5. In embodiments of the present invention generator system controller 103 identifies UVRT events and regulates the power factor in addition to the voltage output, and gradually ramps the power factor back to it's initial set point after voltage recovery to prevent reactive power consumption. In one embodiment of the present invention the AVR 104 switches to inverted voltage bias signal that is proportional in magnitude to the transient output voltage drop. Due to its inverted nature however this bias signal in AVR will regulate for power factor. A new power factor will be targeted and will gradually reduce to the initial pre-UVRT power factor set point value as the generator output voltage settles to the generator's rated set point value. To reduce steep changes in reactive power output a ramp or other gradual curve is utilized to gradually bring the bias voltage to it's initial set point. FIG. 6 depicts simulation results 600 of a generator system having power factor control in an exemplary embodiment. The simulation results 600 include the same x and y axes as the simulation results 500 and also include a y-axis of a set power factor 604 and a corresponding set power factor graph 640. At time 650, the power grid 101 (and thereby the output of the generator 102) experiences a voltage dip. Similar to above, the generator 102 begins to supply a large amount of reactive power to the grid (e.g., denoted by the spike in the reactive power graph 510 at time 650) in order to support the power grid 101 in maintaining/recovering the voltage. Also at this time or slightly after, the controller 103 detects the voltage dip and determines an adjusted value for the set power factor based on the voltage dip.

At time 651 the controller adjusts the set power factor 604 of the generator system 100 from an initial value 641 to an adjusted value 642. From time 651 to time 653 (e.g., the set time period) the controller ramps the set power factor from the adjusted value to the initial value. As indicated by point 654 (e.g., the lowest point of the reactive power graph 510), over the time 651 to time 653, the reactive power graph 510 never crosses zero and never consumes the reactive power. Thus, the generator system 102 using the power factor control method the generator system 100 may be grid code compliant (GCC).

The disclosure is described above with reference to drawings. These drawings illustrate certain details of specific embodiments that implement the systems and methods and programs of the present disclosure. However, describing the disclosure with drawings should not be construed as imposing on the disclosure any limitations that may be present in the drawings. The present disclosure contemplates methods, systems and program products on any machine-readable media for accomplishing its operations. The embodiments of the present disclosure may be implemented using an existing computer processor, or by a special purpose computer processor incorporated for this or another purpose or by a hardwired system. No claim element herein is to be construed under the provisions of 35 U.S.C. § 112, sixth paragraph, unless the element is expressly recited using the phrase "means for." Furthermore, no element, component or method step in the present disclosure is intended to be dedicated to the public, regardless of whether the element, component or method step is explicitly recited in the claims.

As noted above, embodiments within the scope of the present disclosure include program products comprising machine-readable storage media for carrying or having machine-executable instructions or data structures stored thereon. Such machine-readable storage media can be any available media that can be accessed by a computer or other machine with a processor. By way of example, such machine-readable storage media can include RAM, ROM, EPROM, EEPROM, CD ROM or other optical disk storage, magnetic disk storage or other magnetic storage devices, or any other medium which can be used to carry or store desired program code in the form of machine-executable instructions or data structures and which can be accessed by a computer or other machine with a processor. Combinations of the above are also included within the scope of machine-readable storage media. Machine-executable instructions include, for example, instructions and data which cause a computing device or machine to perform a certain function or group of functions. Machine or computer-readable storage media, as referenced herein, do not include transitory media (i.e., signals in space).

Embodiments of the disclosure are described in the general context of method steps which may be implemented in one embodiment by a program product including machine-executable instructions, such as program code, for example, in the form of program modules executed by machines in networked environments. Generally, program modules include routines, programs, objects, components, data structures, etc., that perform particular tasks or implement particular abstract data types. Machine-executable instructions, associated data structures, and program modules represent examples of program code for executing steps of the methods disclosed herein. The particular sequence of such executable instructions or associated data structures represent examples of corresponding acts for implementing the functions described in such steps.

Embodiments of the present disclosure may be practiced in a networked environment using logical connections to one or more remote computers having processors. Logical connections may include a local area network (LAN) and a wide area network (WAN) that are presented here by way of example and not limitation. Such networking environments are commonplace in office-wide or enterprise-wide computer networks, intranets and the Internet and may use a wide variety of different communication protocols. Those skilled in the art will appreciate that such network computing environments will typically encompass many types of computer system configurations, including personal computers, hand-held devices, multi-processor systems, microprocessor-based or programmable consumer electronics, network PCs, servers, minicomputers, mainframe computers, and the like. Embodiments of the disclosure may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing the overall system or portions of the disclosure might include a computing device that includes, for example, a processing unit, a system memory, and a system bus that couples various system components including the system memory to the processing unit. The system memory may include read only memory (ROM) and random access memory (RAM) or other non-transitory storage medium. The computer may also include a magnetic hard disk drive for reading from and writing to a magnetic hard disk, a magnetic disk drive for reading from or writing to a removable magnetic disk, and an optical disk drive for reading from or writing to a removable optical disk such as a CD ROM or other optical media. The drives and their associated machine-readable media provide nonvolatile storage of machine-executable instructions, data structures, program modules, and other data for the computer.

It should be noted that although the flowcharts provided herein show a specific order of method steps, it is understood that the order of these steps may differ from what is depicted. Also two or more steps may be performed concurrently or with partial concurrence. Such variation will depend on the software and hardware systems chosen and on designer choice. It is understood that all such variations are within the scope of the disclosure. Likewise, software and web implementations of the present disclosure could be accomplished with standard programming techniques with rule based logic and other logic to accomplish the various database searching steps, correlation steps, comparison steps and decision steps. It should also be noted that the word "component" as used herein and in the claims is intended to encompass implementations using one or more lines of software code, and/or hardware implementations, and/or equipment for receiving manual inputs.

The foregoing description of embodiments of the disclosure have been presented for purposes of illustration and description. It is not intended to be exhaustive or to limit the disclosure to the precise form disclosed, and modifications and variations are possible in light of the above teachings or may be acquired from practice of the disclosure. The embodiments were chosen and described in order to explain the principals of the disclosure and its practical application to enable one skilled in the art to utilize the disclosure in various embodiments and with various modifications as are suited to the particular use contemplated.

What is claimed is:

1. A power generator system comprising:
a generator configured to supply power to a power grid;
an automatic voltage regulator configured to regulate a voltage of an output of the generator to a set voltage and regulate a power factor of the output to a set power factor; and
a controller configured to detect a fault on the output of the generator, adjust the set power factor from an initial value to an adjusted value based on the fault, and ramp the set power factor from the adjusted value back to the initial value over a set time period.

2. The power generator system of claim 1, wherein the fault is an under voltage ride through (UVRT) condition.

3. The power generator system of claim 1, wherein determining the fault comprises detecting an amount that the voltage of the output of the generator is below the set voltage.

4. The power generator system of claim 3, wherein adjusting the set power factor based on the fault comprises interpolating the adjusted value based on the amount that the voltage of the output is below the set voltage and adjusting the set power factor from the initial value by the amount to the adjusted value.

5. The power generator system of claim 4, wherein the interpolation between the adjusted value and the amount that the voltage of the output is below the set voltage is linear.

6. The power generator system of claim 4, wherein to ramp the set power factor back to the initial value of the set power factor includes interpolating the set time period based the adjusted value.

7. The power generator system of claim 6, wherein the interpolation between the set time period and the adjusted value is linear.

8. The power generator system of claim 1, wherein the ramping between the adjusted value and the initial value of the set power factor comprises a step-wise linear function over the set time period.

9. The power generator system of claim 1, wherein the controller outputs a direct current (DC) bias signal to the automatic voltage regulator and the DC bias signal is configured to indicate the set power factor.

10. The power generator system of claim 9, wherein adjusting the set power factor comprises adjusting the DC bias signal within a range of 0 and 10 volts.

11. A controller of one or more generators comprising:
a processor configured to:
detect a fault on an output of one or more generators;
adjust a set power factor of an automatic voltage regulator connected to the one or more generators based on the fault; and
ramp the set power factor back to an initial value over a set period of time, wherein the set period of time is based on the fault.

12. The controller of claim 11, wherein determining the fault comprises detecting an amount that a voltage of the output of the one or more generators is below a set voltage.

13. The controller of claim 12, wherein ramping the set power factor back to the initial value comprises determining the set period of time based the amount that the voltage of the output of the one or more generators is below the set voltage.

14. The controller of claim 13, further comprising an output terminal configured to connect to the automatic voltage regulator, the automatic voltage regulator configured to regulate the voltage of the output of the one or more generators to the set voltage and regulate a power factor of the output of the one or more generators to the set power factor, wherein the processor is further configured to output a direct current (DC) bias signal via the output terminal, and wherein a magnitude of the DC bias signal is configured to indicate the set power factor.

15. The controller of claim 14, wherein adjusting and ramping the set power factor comprises tuning the DC bias signal within a range of 0 and 10 volts.

16. A method of controlling a power factor of a generator system comprising:
detecting, by a controller of a generator system, a fault on a power grid;
determining, by the controller, an adjusted value for a set power factor based on the fault;
adjusting, by the generator system, the set power factor from an initial value to the adjusted value; and
ramping, by the generator system, the set power factor from the adjusted value back to the initial value over a set period of time.

17. The method of claim 16, wherein detecting the fault comprises detecting an amount that a voltage of an output of the generator system is below a set voltage.

18. The method of claim 17, wherein determining the adjusted value comprises interpolating an amount of power factor correction based on the amount that the voltage of the output of the generator system is below the set voltage.

19. The method of claim 18, ramping the set power factor back to the initial value is done in a step-wise linear fashion over the set period of time, and wherein the set period of time is determined based on the amount of power factor correction.

20. The method of claim 19, wherein the amount of power factor correction is large enough and set time period is long enough such that the generator system does not consume any reactive power from the power grid.

* * * * *